No. 695,934. Patented Mar. 25, 1902.
C. L. HORACK.
WHEEL.
(Application filed Aug. 3, 1898.)
(No Model.)
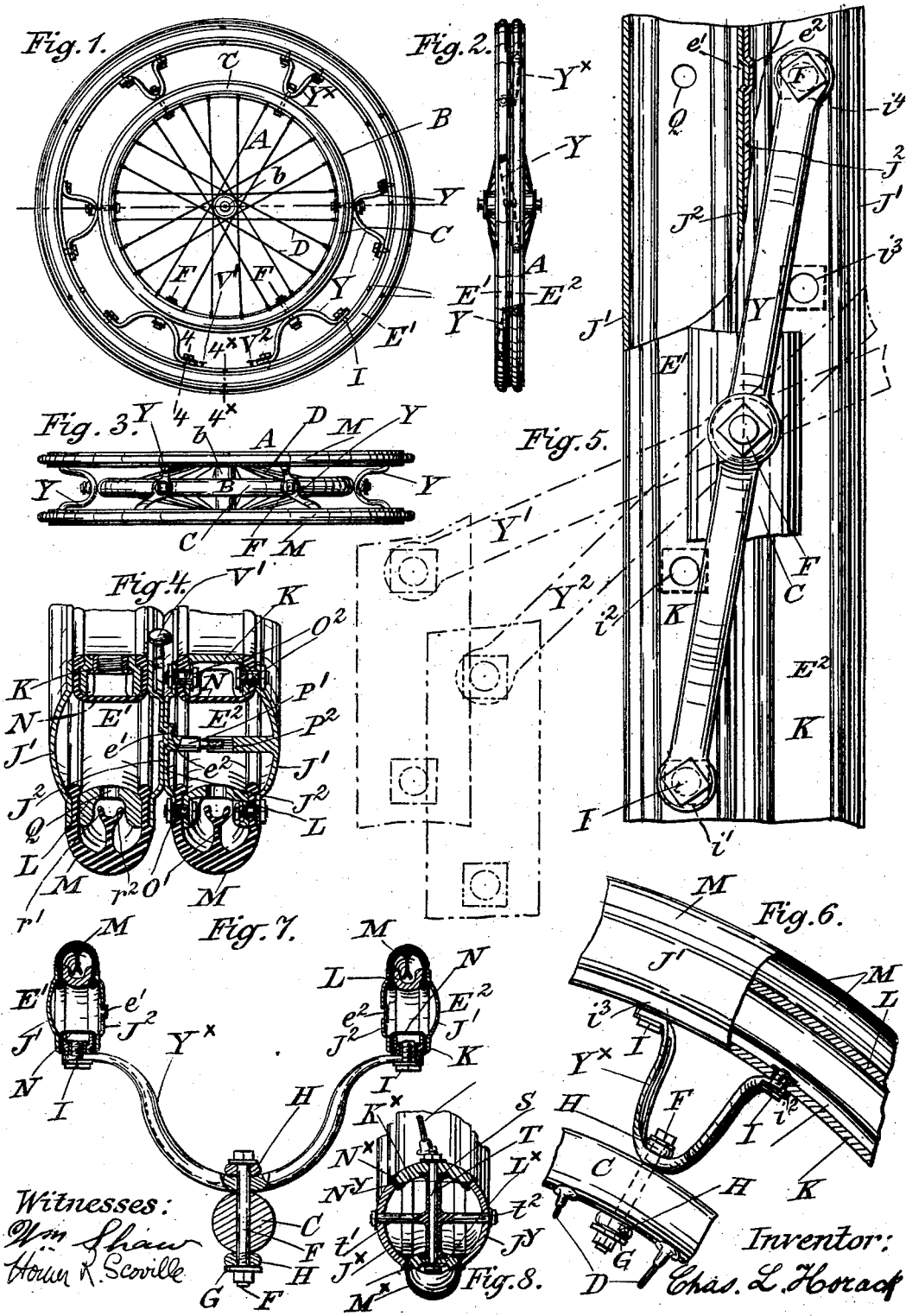
Witnesses:
Wm Shaw
Horun R Scoville
Inventor:
Chas. L. Horack

UNITED STATES PATENT OFFICE.

CHARLES L. HORACK, OF NEW YORK, N. Y.

WHEEL.

SPECIFICATION forming part of Letters Patent No. 695,934, dated March 25, 1902.

Application filed August 3, 1898. Serial No. 687,588. (No model.)

*To all whom it may concern:*

Be it known that I, CHARLES L. HORACK, a citizen of the United States, and a resident of New York, in the county of Kings and State of New York, have invented certain new and useful Improvements in Wheels, of which the following is a specification.

My invention refers to wheels to be attached to all kinds of vehicles, and more particularly to wheels for cycles.

The objects of my invention are to provide for the construction of wheels with rims, consisting of parts that may be assembled readily and without the use of complicated tools or machinery and when so assembled shall form a strong and simple structure in which the material shall be employed to good advantage and possessing a proper degree of elasticity, and which rims may be made to comprise a pneumatic cushion with improved tire, requiring a small quantity of rubber, but serving to inclose a large body of air and capable of being inflated in usual manner.

A further object is to construct a wheel with two rims capable of relative displacement with regard to each other, so as to be able to widen or narrow the wheel-base, as circumstances may require, and to hold said rims firmly in such varying relative positions.

I accomplish these and other useful objects by the means hereinafter described, and set forth more particularly in the claims.

In the accompanying drawings, forming part of this specification, and wherein like letters of reference refer to corresponding parts, Figure 1 is a side elevation of a wheel embodying all the features of my invention, the upper half of said figure illustrating the condition existing when the rims are placed as far apart as is practicable in the structure illustrated, while the lower half illustrates the condition existing when the two rims are placed as close together as practicable. Fig. 2 is an end view of the wheel, the two rims being placed close together; and Fig. 3, a top view of the same, the two rims being placed in a position intermediate between those illustrated in Fig. 1. Fig. 4 shows cross-sections of the two rims, the section through the left-hand rim being placed along line 4 4 and the section through the right-hand rim along line $4^\times 4^\times$ in Fig. 1. Fig. 5 is an inside view of portions of the two rims placed close together and of the means employed for holding the same in proper relative positions, one of the rims and the connecting means being also shown in broken lines in other positions which they may be made to assume. Fig. 6 is a side elevation, partly in section, of yoke $Y^\times$ and adjoining parts, as shown in the upper part of Fig. 1, while Fig. 7 is a section in a plane through the points where said yoke connects with said rims and with the interior wheel or hub. Fig. 8 is a cross-section of the outer portion of a wheel employing only a single rim and tire, which embodies some features of my invention. Figs. 4 and 5 are drawn to about four times and Figs. 6 and 7 to about twice the scale employed in Figs. 1, 2, and 3.

My improved wheel, having two rims adjustable with reference to each other, is particularly applicable in connection with cycles when the ground is wet, so as to make wheels of cycles slip thereon, particularly when turning curves and it becomes desirable to provide a wider wheel-base. This I accomplish by the following means: The wheel A comprises a central section B, serving as a hub and constructed as a wheel and shown here to have a rim C, preferably made of wood, and wire spokes D. The outer rim of wheel A is divided vertically, so as to consist of two annular members E' and E², substantially symmetrically arranged with reference to the central longitudinal plane of said wheel. These members are attached to rims C by yokes Y, their central portions being held to said rim by screw-bolts F, also passing through washers G and bolsters H, the latter preferably made elastic, and are held to members E' and E² by screws I, entering into proper sockets, as $i'$ $i^2$, on member E', and screws I², entering into sockets $i^3$ and $i^4$ on member E². These sockets are so placed that by alternately attaching the ends of yokes Y to different combinations of sockets the yokes may be made to assume different angles with reference to the plane between the two members E' and E², and thereby said two members may be secured at such distances from each other as may be desired, thus increasing the wheel-base accordingly.

In Fig. 5, Y indicates the direction of the yoke when attached to sockets $i'$ and $i^4$, while Y' in broken lines shows the direction of the yoke when attached to sockets $i^2$ and $i^3$, and Y², also in broken lines, shows its position when either attached to sockets $i'$ and $i^3$ or $i^2$ and $i^4$. Successive yokes Y should be placed staggering, so as to thoroughly brace the members of the wheel-rim with reference to each other and rim C and prevent narrowing or spreading of the wheel-base. Said members are provided on their inner faces with projections $e'$ and corresponding recesses $e^2$, so that when placed in adjoining positions, as illustrated in Fig. 4, they will interlock.

Members E' and E², as well as the rim of the wheel, (illustrated in Fig. 8,) are each shown to be constructed of annular sections detachably joined together for the purpose of readily attaching and detaching proper tires and inspecting and replacing part of said rims.

Referring first to members E' and E², in Figs. 1 to 7, inclusive, the same consist, chiefly, of annular side portions J' and J², made of sheet metal, inner annular portion K and outer such portion L, made of wood, and rubber or membrane tire M, the edges of said tire serving as packing between parts J' and J² and L, while a strip of rubber N performs the same function with reference to parts J', J², and K. All these parts are locked together by means of screw-bolts, as O', preferably with right and left screw-thread at their ends, passing through tire M and parts J', J², and L, and similar screw-bolts, as O², passing through parts J' J² K and rubber band N, the outer members J' being curved outward in general, but provided with straight flanges, through which the bolts pass. P' represents one of a series of studs on the inner surface of member E', entering into corresponding sockets, as P², on the inner surface of member E², said sockets being preferably provided with spring-jaws. By means of these studs and sockets the members forming the wheel-rims can be brought into and maintained in their proper relative positions until screw-bolts O' and O² can be properly secured. Inner annular portions K contain the sockets $i'$, $i^2$, $i^3$, and $i^4$, to which yokes Y are secured. V' and V² are pneumatic valves in members J² for forcing air into the wheel-rims, annular members L being provided with perforations Q at intervals, so as to apply the air-pressure to the interiors of tires M. It will be seen that under my construction only the joints between parts J' and J² and tire M and bolster N need to be made airtight. This is done by tightening bolts O' and O² and employing cement in addition, if desired. Said bolts will also prevent creeping of the tire along adjoining members. Outer annular member L is recessed on its outer surface, and into such recess extends a rib R on tire M, which is so forked along its inner edge that when a given compression— say a quarter of an inch of the tire—has taken place both prongs $r'$ and $r^2$ of said forking part will contact with the recessed part of member L when the compression is vertical, while if the same is wholly or partly lateral only one of said prongs will so contact. This construction permits of making the tire comparatively light and of using it temporarily, even after puncturing has taken place.

The spokes of interior wheel B, I preferably make elastic, slanting outward from rim C toward its hub $b$, so as to add to the strength and stability of the whole structure, which is important, particularly when rims E' and E² are placed apart. By having a single hub jointly for the two rims E' and E² the necessity of duplicating the ball-bearings, which would otherwise arise, is obviated.

In Fig. 8 corresponding annular members $J^x$, $J^y$, $K^x$, and $L^x$, but all indicated to be made of wood, paper, or the like, are assembled in similar manner with a tire $M^x$ and two rubber bolsters $N^x$ and $N^y$, the means for joining the same together consisting of radial bolts S, passing through members $K^x$ and $L^x$, and an interior bracing-tube T, which tube also has lateral arms $t'$ and $t^2$, passing through members $J^x$ and $J^y$ and serving as bolts holding said members in place. As this wheel-rim is not designed to be subjected to pneumatic pressure, I use two rubber bolsters $N^x$ and $N^y$ in place of band N above referred to.

I claim—

1. In a wheel, the combination with a hub, of two rims, each provided with a proper bearing-surface, means for connecting said hub with said rims, and mechanism for varying the distance between said bearing-surfaces.

2. In a wheel, the combination with a hub, of two rims, each provided with a flexible tire, means for connecting said hub with said rims, and mechanism for varying the relative positions of said rims.

3. The combination with two wheel-rims, of a hub and continuous braces secured to said rims and attached to said hub, and means for varying the relative positions of said braces and said rims.

4. The combination with two wheel-rims, of a support for said rims constructed as a wheel comprising a hub, a rim and intermediate spokes, and adjustable connections between said rims and said wheel.

5. The combination with two wheel-rims, one adapted to be revolved with reference to the other, of a hub, and means interposed between said hub and said rims for confining the latter in varying relative positions.

6. The combination with two wheel-rims one adapted to be revolved and to be displaced laterally with reference to the other, of a hub, and means interposed between the hub and said rims for confining the latter in proper relative positions.

7. The combination with two wheel-rims, of a hub, braces interposed between the rims and the hub, and means for attaching such braces at oblique angles relative to the longitudinal planes of said rims.

8. The combination with two wheel-rims, of a hub, braces interposed between the rims and the hub, and means for attaching said braces at varying angles relative to the longitudinal planes of said rims.

9. The combination with two wheel-rims, of a hub, and braces attached to the rims and the hub, and means for attaching alternate braces at oblique angles relative to the longitudinal planes of said rims, intermediate braces being placed staggering with reference to said alternate braces.

10. The combination with two wheel-rims, of a hub, braces secured to said rims and said hub, elastic bolsters and means for interposing the same between said hub and said braces.

11. The combination with two wheel-rims, of a hub, means for adjusting said rims at varying relative positions, and contact portions on said rims adapted to interlock.

12. In a wheel-rim, the combination with two annular members adapted to be adjusted in a lateral direction, of a suitable tire, and proper stays between said members.

13. In a wheel-rim, the combination with two annular members adapted to be adjusted in a lateral direction of a suitable tire and independent stays between the upper portions and between the lower portions of said members.

14. In a wheel, the combination with a rim, comprising two upright annular metallic members and lateral stays between the same capable of relative adjustment, combined with a hub and proper connections between rim and hub.

15. In a wheel-rim, the combination of a series of the members forming the same arranged in a continuous U-shaped body, with an elastic membrane interposed between portions of three such members and placed between the branches of said U-shaped body.

16. In a wheel-rim the combination with a continuous body of U-shaped cross-section comprising three annular members, of a continuous membrane interposed between said three members and forming with the same a body of annular cross-section.

17. In a wheel-rim, the combination with two rigid vertical members, of an interior and an exterior elastic member each interposed between said rigid members, the four members inclosing an air-space, and proper stays for maintaining said members in position.

18. In a wheel-rim, the combination with two rigid upright members and an inner and an outer lateral member interposed between the same, of an inner and an outer flexible member interposed between the upright members and together with the same inclosing an air-space.

19. In a wheel-rim, the combination with two rigid upright members and an inner and an outer lateral member interposed between the same, of an inner and an outer flexible member interposed between the upright members and together with the same inclosing an air-space, and an inflating-valve.

20. In a wheel, the combination with its hub, of a hollow rim and a flexible tire jointly inclosing an air-space, and a continuous flexible membrane between the portion of the rim to which said stays are attached and the air-space between rim and tire.

21. In a wheel-rim, the combination with two lateral members and two interposed upright members, of independent detachable securing means for holding one of the upright members to other members of the rim.

Signed at New York, in the county of New York and State of New York, this 1st day of August, A. D. 1898.

CHARLES L. HORACK.

Witnesses:
HOMER R. SCOVILLE,
W. FARRINGTON.